(12) United States Patent
Jarvis

(10) Patent No.: US 11,459,114 B2
(45) Date of Patent: Oct. 4, 2022

(54) SYSTEMS AND METHODS FOR PARACHUTE-ASSISTED LANDING OF AN UNMANNED AERIAL VEHICLE

(71) Applicant: The Boeing Company, Chicago, IL (US)

(72) Inventor: Joshua B. Jarvis, St. Louis, MO (US)

(73) Assignee: The Boeing Company, Chicago, IL (US)

(*) Notice: Subject to any disclaimer, the term of this patent is extended or adjusted under 35 U.S.C. 154(b) by 301 days.

(21) Appl. No.: 16/881,684

(22) Filed: May 22, 2020

(65) Prior Publication Data
US 2021/0362861 A1 Nov. 25, 2021

(51) Int. Cl.
*B64D 7/00* (2006.01)
*B64D 17/80* (2006.01)
*B64C 39/02* (2006.01)
*B64D 17/34* (2006.01)

(52) U.S. Cl.
CPC ............ *B64D 17/80* (2013.01); *B64C 39/024* (2013.01); *B64D 17/34* (2013.01); *B64C 2201/027* (2013.01); *B64C 2201/042* (2013.01); *B64C 2201/14* (2013.01); *B64C 2201/185* (2013.01)

(58) Field of Classification Search
CPC ..................................................... B64D 17/80
See application file for complete search history.

(56) References Cited

U.S. PATENT DOCUMENTS

| 2016/0318615 | A1* | 11/2016 | Pick | B64D 17/54 |
|---|---|---|---|---|
| 2020/0115046 | A1* | 4/2020 | Yoeli | B64C 39/024 |
| 2020/0115049 | A1* | 4/2020 | Nakamura | B64D 17/54 |
| 2020/0216181 | A1* | 7/2020 | Yagihashi | B64D 25/00 |
| 2021/0387718 | A1* | 12/2021 | Nakamura | B64C 13/20 |

FOREIGN PATENT DOCUMENTS

KR 20210114825 A * 9/2021

* cited by examiner

*Primary Examiner* — Richard G Davis
(74) *Attorney, Agent, or Firm* — McDonnell Boehnen Hulbert & Berghoff LLP

(57) ABSTRACT

In an example, a system is described. The system comprises an unmanned aerial vehicle (UAV) having a UAV control system to control flight of the UAV. The system also comprises a steerable parachute system for parachute-assisted landing. The steerable parachute system comprises (i) a deployable parachute having steerable parachute cables, (ii) steering actuators, each steering actuator coupled to, and movable to adjust, a respective steerable parachute cable, (iii) a steerable parachute controller, and (iv) one or more parachute system sensors communicatively coupled to the steerable parachute controller and configured to detect physical characteristics of a reachable landing zone for the UAV. The steerable parachute controller is configured to (i) select a safe landing location within the reachable landing zone based on the physical characteristics and (ii) control movement of the steering actuators to steer the parachute to land the UAV at the safe landing location.

20 Claims, 7 Drawing Sheets

SYSTEMS AND METHODS FOR PARACHUTE-ASSISTED LANDING OF AN UNMANNED AERIAL VEHICLE

FIELD

The present disclosure relates generally to operation of unmanned aerial vehicles (UAVs), and more particularly, to systems and methods for parachute-assisted landing of a UAV.

BACKGROUND

It is often desirable to utilize unmanned aerial vehicles (UAVs) for various purposes, such as to transport cargo to various destinations. Such UAVs can include, for instance, helicopters or other multi-rotor rotorcraft. Existing UAVs typically include autonomous systems to assist with driving and landing the UAV.

Currently, existing UAVs employ ballistic parachutes for landing the UAV. However, these and other existing systems for landing UAVs provide less steering control than desired and often do not enable the UAVs to be able to choose where to land.

What is needed is a system and method that allows a UAV to efficiently select a desirable location at which to land and safely navigate itself to land at that location.

SUMMARY

In an example, a system is described. The system comprises an unmanned aerial vehicle (UAV) having a UAV control system to control flight of the UAV. The system also comprises a steerable parachute system for parachute-assisted landing. The steerable parachute system comprises (i) a deployable parachute having a plurality of steerable parachute cables, (ii) a plurality of steering actuators, each steering actuator coupled to a respective steerable parachute cable and movable to adjust the respective steerable parachute cable, (iii) a steerable parachute controller, and (iv) one or more parachute system sensors communicatively coupled to the steerable parachute controller and configured to detect physical characteristics of a reachable landing zone for the UAV. The steerable parachute controller is configured to (i) select a safe landing location within the reachable landing zone based on the physical characteristics detected with the one or more parachute system sensors and (ii) control movement of the plurality of steering actuators to steer the deployable parachute to land the UAV at the safe landing location.

In another example, a method for parachute-assisted landing of an unmanned aerial vehicle (UAV) is described. The method comprises detecting, by a steerable parachute controller of a steerable parachute system for the UAV and using one or more parachute system sensors of the steerable parachute system that are communicatively coupled to the steerable parachute controller, physical characteristics of a reachable landing zone for the UAV, where steerable parachute system further comprises (i) a deployable parachute having a plurality of steerable parachute cables and (ii) a plurality of steering actuators, each steering actuator coupled to a respective steerable parachute cable and movable to adjust the respective steerable parachute cable. The method also comprises selecting, by the steerable parachute controller, a safe landing location within the reachable landing zone based on the physical characteristics. The method also comprises controlling, by the steerable parachute controller, movement of the plurality of steering actuators to steer the deployable parachute to land the UAV at the safe landing location.

In another example, a system is described. The system comprises an unmanned aerial vehicle (UAV) having a UAV control system to control flight of the UAV, the UAV control system comprising one or more UAV sensors attached to the UAV. The system also comprises a steerable parachute system for parachute-assisted landing, comprising (i) a housing, (ii) a deployable parachute releasably disposed within the housing, the deployable parachute having a plurality of steerable parachute cables and a plurality of static cables, (iii) a plurality of steering actuators disposed within the housing, each steering actuator coupled to a respective steerable parachute cable and movable to adjust the respective steerable parachute cable, (iv) a steerable parachute controller disposed within the housing, and (iv) one or more parachute system sensors attached to the UAV and communicatively coupled to the steerable parachute controller. The steerable parachute system operates independently from the UAV control system. The steerable parachute controller is configured to (i) detect a trigger for a parachute-assisted landing and (ii) responsive to detecting the trigger, (a) select a safe landing location based on at least one of first data acquired by the one or more UAV sensors or second data acquired by the one or more parachute system sensors and (b) control movement of the plurality of steering actuators to steer the deployable parachute to land the UAV at the safe landing location.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
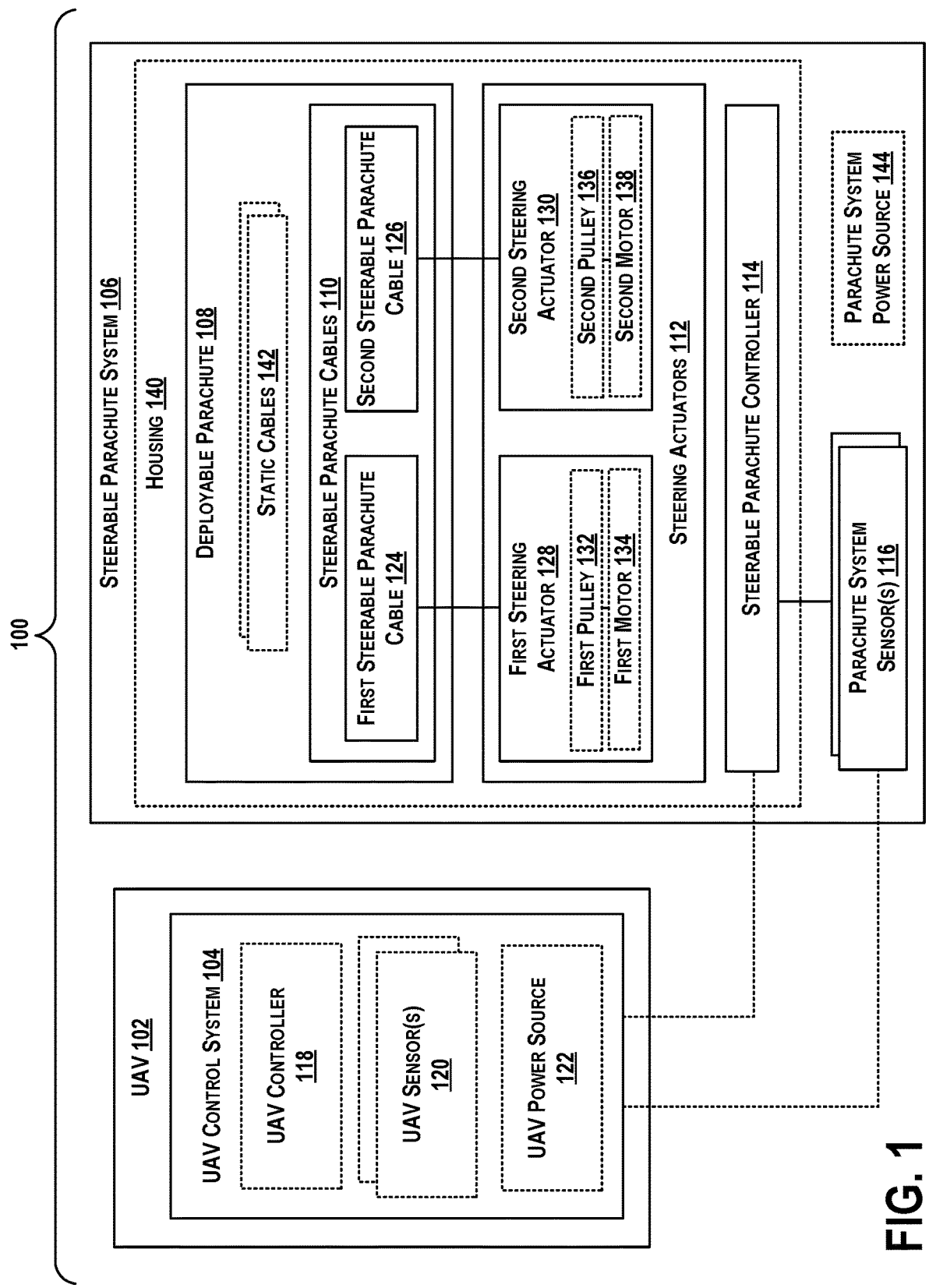
FIG. 1 depicts an example of a system for parachute-assisted landing of a UAV, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Example systems and methods are described for parachute-assisted landing of a UAV. To this end, the systems and methods described herein provide for a UAV having a UAV control system that controls the UAV's flight. The systems and methods also provide for a steerable parachute system that includes a steerable parachute controller that can operate in conjunction with, or independently from, the UAV control system. The steerable parachute system includes a deployable parachute and a plurality of steering actuators. Within examples, a plurality of steerable parachute cables are coupled to the parachute and each of the steering actuators are coupled to a respective one of the steerable parachute cables and movable to adjust the steerable parachute cable, thereby steering the parachute to land at a desired location. The steerable parachute system also includes one or more parachute system sensors, which can be different and separate from, or the same as, the sensor(s) that the UAV might typically include and use for operation, and can be used to detect physical characteristics (e.g., the presence of buildings, trees, etc.) on the ground in an environment of the UAV. The steerable parachute controller is thus configured to select a safe landing location within a reachable landing zone based on the physical characteristics that the parachute system sensor(s) detects, and then control movement of the steering actuators to steer the parachute and land the UAV at the safe landing location.

These systems and methods can advantageously improve a UAV's decisions on where to land and provide a reliable, efficient, and safe way to land the UAV in many different types of areas, such as urban, suburban, and rural environments. Such advantages can be particularly useful in scenarios where the UAV experiences less-than-optimal performance of one or more components of the UAV and might thus need to quickly find an area in which to land and safely land in that area. Further, such systems and methods can be advantageously employed across a wide-range of UAVs.

These and other improvements are described in more detail below. Implementations described below are for purposes of example. The implementations described below, as well as other implementations, may provide other improvements as well.

The following examples will be described herein primarily with respect to UAVs. It should be understood, however, that the systems and methods described herein can be applied in the context of parachute-assisted landing for manned aerial vehicles, such as those that include autonomous features.

Referring now to the figures, FIG. 1 depicts an example of a system 100 for parachute-assisted landing of a UAV 102, according to an example implementation. The system 100 includes the UAV 102, which has a UAV control system 104 to control flight of the UAV 102. The system 100 also includes a steerable parachute system 106 for parachute-assisted landing. The steerable parachute system 106 includes a deployable parachute 108 having a plurality of steerable parachute cables 110. The steerable parachute system 106 also includes a plurality of steering actuators 112, each steering actuator coupled to a respective steerable parachute cable of the plurality of steerable parachute cables 110 and movable to adjust the respective steerable parachute cable. Additionally, the steerable parachute system 106 includes a steerable parachute controller 114, as well as one or more parachute system sensors 116 that is/are communicatively coupled to (e.g., via a wired and/or wireless interface) the steerable parachute controller 114 and configured to detect physical characteristics of a reachable landing zone for the UAV 102.

The UAV 102 can take the form of a multi-rotor rotorcraft such as a helicopter, or can take the form of another type of aircraft without a human pilot or operator.

The UAV control system 104 can take the form of one or more computing devices and/or other components that facilitates at least a portion of the control of the UAV 102, including but not limited to flight operations (e.g., speed control, altitude control, etc.). For instance, as shown in FIG. 1, within examples the UAV control system 104 includes a UAV controller 118, one or more UAV sensors 120, and a UAV power source 122.

The UAV controller 118, for instance, can take the form of a processor, such as a general-purpose processor or special purpose processor (e.g., a digital signal processor, application specific integrated circuit, etc.). The UAV controller 118 can include memory as well. The processor can be configured to execute instructions (e.g., computer-readable program instructions including computer executable code) that are stored in the memory and are executable to provide various operations described herein. The memory can take the form of one or more computer-readable storage media, such as non-transitory computer-readable media, that can be read or accessed by the processor. The computer-readable storage media can include volatile and/or non-volatile storage components, such as optical, magnetic, organic or other memory or disc storage, which can be integrated in whole or in part with the processor. The memory can store other data as well in addition to executable instructions, such as data acquired by the one or more UAV sensors 120, data acquired by the one or more parachute system sensors 116, predetermined maps of various environments of the UAV 102, and/or other data. In some examples, the memory can be implemented using a single physical device (e.g., one optical, magnetic, organic or other memory or disc storage unit), while in other examples, the memory can be implemented using two or more physical devices. In alternative examples, the UAV controller 118 can include additional processors that are configured in the same manner. At least some of the operations described herein as being performed by the system 100 can be performed by the processor of the UAV controller 118 in some examples.

Although not explicitly shown in FIG. 1, the UAV controller 118 can be in communication with a ground-based controller (e.g., ground control station), satellite, and/or other devices that facilitate control of the UAV 102. In some examples, the UAV controller 118 can be entirely located onboard the UAV 102, although in other examples, a remote system such as a ground-based controller can be considered to be part of the UAV controller 118.

The one or more UAV sensors 120 can include one or more infrared sensors, LIDAR sensors, radar sensors, cameras, global positioning system (GPS) sensors, etc. that are configured for use in facilitating performance of various operations related to control of the UAV 102. For example, data acquired by the one or more UAV sensors 120 can be used for detecting objects or weather in an environment of the UAV 102 so that the UAV controller 118 can then control operation (e.g., speed, altitude, direction) of the UAV 102 based on the detected objects or weather. As another example, the one or more UAV sensors 120 can periodically or continuously provide the UAV controller 118 with the GPS coordinates of the UAV 102 so that the UAV controller 118 can in turn provide a ground control station or other form of controller external from the UAV 102 with the current location of the UAV 102. The one or more UAV sensors 120 can be communicatively linked to the UAV controller 118 via one or more wired and/or wireless connections. In some examples, the one or more UAV sensors 120 can be communicatively linked to the steerable parachute controller 114.

Further, the one or more UAV sensors 120 can be attached to (e.g., mounted on), or integrated with, the UAV 102 and can be positioned at different locations with respect to the UAV 102. For example, at least one of the one or more UAV sensors 120 can be located on or in the nose of the UAV 102, a wing of the UAV 102, a top surface of the UAV 102, and/or an underside of the UAV 102, among other possible locations.

The UAV power source 122 can take the form of a battery, generator, or other type of power source configured to provide electric power to one or more components of the UAV 102, such as the UAV controller 118 and/or the one or more UAV sensors 120. In some examples, the UAV power source 122 can be connected to another power source that is external to the UAV control system 104 and can be used as a trickle charger for charging that other power source.

The steerable parachute system 106 can take the form of components that facilitate parachute-assisted landing of the UAV 102. The steerable parachute system 106 can be integrated with the UAV 102 or can be a separate system that is attached (e.g., mounted, using various fasteners) to the UAV 102. As will be described in more detail below, one or more components of the steerable parachute system 106 can be communicatively linked to one or more components of the UAV control system 104.

The deployable parachute 108 can take the form of a rectangular parachute, round parachute, or other geometry of parachute having varying dimensions and fabricated from varying materials (e.g., nylon, aramid fibers, etc.). For example, the deployable parachute 108 can take the form of a rectangular parachute similar to a parachute that is used by skydivers. Other examples are possible as well.

The plurality of steerable parachute cables 110 can take the form of nylon rope, aramid fiber cords, and/or another type of flexible parachute cord. In the example system 100 shown in FIG. 1, the plurality of steerable parachute cables 110 includes a first steerable parachute cable 124 and second steerable parachute cable 126, although in other examples, the plurality of steerable parachute cables 110 can include more than two cables. Each of the plurality of steerable parachute cables 110 can be attached to a respective location on the deployable parachute 108 and attached to a respective one of the plurality of steering actuators 112. For example, the first steerable parachute cable 124 can be attached to a first end of the deployable parachute 108 (e.g., at or proximate to a first aft corner of the deployable parachute 108 or along one of the side edges of the deployable parachute 108) and the second steerable parachute cable 126 can be attached to a second end of the deployable parachute 108 that is opposite the first end (e.g., at or proximate to a second aft corner of the deployable parachute 108 or along the opposite side edge of the deployable parachute 108).

Each steering actuator 112 of the plurality of steering actuators 112 can generally take the form of an electromechanical device that is configured to move to adjust (e.g., pull or release) a respective one of the plurality of steerable parachute cables 110. To facilitate this, a respective one of the plurality of steerable parachute cables 110 can be coupled to (e.g., tied around, fastened to, wound around, and/or otherwise attached to) a respective one of the plurality of steering actuators 112.

In some examples, one or more steering actuators of the plurality of steering actuators 112 can take the form of a pulley and a motor that is coupled to a power source. As a representative example, as shown in FIG. 1, the plurality of steering actuators 112 includes a first steering actuator 128 and second steering actuator 130, where the first steering actuator 128 includes a first pulley 132 coupled to a first motor 134 and where the second steering actuator 130 includes a second pulley 136 coupled to a second motor 138. The first steerable parachute cable 124 can be wound around and attached to the first pulley 132 and the second steerable parachute cable 126 can be wound around and attached to the second pulley 136. As such, the first steering actuator 128 is movable to adjust the first steerable parachute cable 124 and the second steering actuator 130 is movable to adjust the second steerable parachute cable 126. That is, the steerable parachute controller 114 can control the first motor 134 to cause the first pulley 132 to adjust the first steerable parachute cable 124 and/or control the second motor 138 to cause the second pulley 136 to adjust the second steerable parachute cable 126.

In other examples, one or more steering actuators of the plurality of steering actuators 112 can take the form of a mechanical arm. For example, the first steering actuator 128 can take the form of a first mechanical arm that is movable to adjust the first steerable parachute cable 124 and the second steering actuator 130 can take the form of a second mechanical arm that is movable to adjust the second steerable parachute cable 126. The plurality of steering actuators 112 can take other forms as well. In some examples, each steering actuator 112 can be of the same type, and in other examples the plurality of steering actuators 112 can include different types of steering actuators (e.g., one pulley-motor combination, and one mechanical arm).

In these and other examples, the adjustment of the plurality of steerable parachute cables 110 caused by the plurality of steering actuators 112 steers the UAV 102 during landing. As such, the plurality of steering actuators 112 can be designed to adjust (e.g., pull or release) cables in order to appropriately steer the parachute during a landing.

The steerable parachute controller 114 can include one or more processors, a memory, and/or other components, each of which can take a form similar to or different from that which is described above with respect to the UAV controller 118. The memory can store executable instructions, such as data acquired by the one or more parachute system sensors 116, data acquired by the one or more UAV sensors 120, predetermined maps of various environments of the UAV 102, and/or other data. The instructions can be executed by the processor(s) to cause the steerable parachute controller 114 to perform operations related to parachute-assisted landing of the UAV 102. At least some of the operations described herein as being performed by the system 100 can be performed by the processor of the steerable parachute controller 114. Although not explicitly shown in FIG. 1, the steerable parachute controller 114 can be in communication with a ground-based controller (e.g., ground control station), satellite, and/or other devices that facilitate control of the UAV 102. In some examples, the steerable parachute controller 114 can be entirely located onboard the UAV 102 or onboard the steerable parachute system 106 that is attached to the UAV 102, although in other examples, a remote system such as a ground-based controller can be considered to be part of the steerable parachute controller 114.

In some examples, the steerable parachute controller 114 can be communicatively linked to the UAV control system 104 (e.g., to the UAV controller 118 and/or the one or more UAV sensors 120) and can be configured to accept signals from such components. In other examples, the steerable parachute controller 114 is configured to be entirely separate from the UAV controller 118 and/or the one or more UAV sensors 120 such that is does not accept signals from such components.

The one or more parachute system sensors 116 can include one or more infrared sensors, LIDAR sensors, radar sensors, cameras, GPS sensors, etc. that are configured for use in facilitating performance of various operations related to parachute-assisted landing of the UAV 102 and perhaps other forms of control of the UAV 102 during standard flight. The steerable parachute controller 114 can take into account data obtained from one or more infrared sensors, LIDAR sensors, radar sensors, cameras, and/or GPS sensors to select a safe landing location within the reachable landing zone based on the physical characteristics detected with the one or more parachute system sensors. Within examples, at least one of the one or more parachute system sensors 116 is a GPS sensor that provides a real-time GPS location of the UAV 102. The steerable parachute controller 114 can compare the real-time GPS location of the UAV 102 to a predetermined map stored in the memory of the steerable parachute controller 114, such as a predetermined map that designates predetermined locations that are known to be safe landing zones (e.g., open fields). In conjunction with comparing real-time GPS location of the UAV 102 to a predetermined map, the steerable parachute controller 114 can also take into account data obtained from one or more infrared sensors, LIDAR sensors, radar sensors, and/or cameras. The steerable parachute controller 114 might additionally provide a ground control station or other form of controller external from the UAV 102 with the current location of the UAV 102. The one or more parachute system sensors 116 can be communicatively linked to the steerable parachute controller 114 via one or more wired and/or wireless connections. In some examples, the one or more parachute system sensors 116 can be communicatively linked to the UAV control system 104 (e.g., to the UAV controller 118) so that data acquired by the parachute system sensors 116 can be shared with the UAV controller 118 to facilitate other UAV operations performed by the UAV controller 118.

Further, the one or more parachute system sensors 116 can be attached to (e.g., mounted on), or integrated with, the UAV 102 and can be positioned at different locations with respect to the UAV 102. For example, at least one of the one or more parachute system sensors 116 can be located on or in the nose of the UAV 102, a wing of the UAV 102, a top surface of the UAV 102, and/or an underside of the UAV 102, among other possible locations.

In some implementations, the steerable parachute system 106 can include one or more other components as well. For example, as shown, steerable parachute system 106 can include a housing 140, a plurality of static cables 142, and a parachute system power source 144.

The housing 140 can take the form of a box or other at-least-partially-enclosed structure within which the deployable parachute 108, the plurality of steering actuators 112, and/or the steerable parachute controller 114 can be disposed. For example, the housing 140 can include a lid that opens and releases the deployable parachute 108 in the event that the UAV controller 118 and/or the steerable parachute controller 114 detects that the UAV 102 is experiencing less-than-optimal performance of power supply, sensor operation, and/or other conditions.

The deployable parachute 108 can include the plurality of static cables 142. One or more of the plurality of static cables 142 can be attached to the housing 140 or the UAV 102. The plurality of static cables 142 can take the form of nylon rope, aramid fiber cords, and/or another type of flexible parachute cord. Unlike the plurality of steerable parachute cables 110, which are controllably adjustable using the plurality of steering actuators 112, the plurality of static cables 142 are not connected to, or adjustable by, the plurality of steering actuators 112, and instead provide additional support and physical connection between the deployable parachute 108 and the UAV 102.

The parachute system power source 144 can take the form of a battery, generator, or other type of power source configured to provide electric power to the steerable parachute controller 114 and the one or more parachute system sensors 116. In some examples, the parachute system power source 144 can be connected to the UAV power source 122 and trickle charge itself off the UAV power source 122.

As discussed above, the steerable parachute system 106 can be used for reliable, efficient, and safe landing of the UAV 102, such as in scenarios where the UAV 102 experiences less-than-optimal performance or conditions. In other words, the steerable parachute system 106 can, in some scenarios, act as a failsafe for the UAV 102. Accordingly, in some examples, the steerable parachute system 106 is a self-contained system that operates independently from the UAV control system 104. Thus, if the UAV control system 104 experiences less-than-optimal conditions, the chances of the steerable parachute system 106 being affected by such conditions are reduced or eliminated.

In the context of this disclosure, independent operation can generally refer to the steerable parachute system 106 being configured to operate as desired without being negatively affected by less-than-optimal or otherwise undesirable performance of the UAV control system 104. However, it should be understood that independent operation of the steerable parachute system 106 can also be accomplished in examples where the UAV control system 104 interacts with the steerable parachute system 106, such as in the context of acting as a failsafe for the UAV control system 104. For example, the steerable parachute controller 114 can share data acquired by the one or more parachute system sensors 116 with the UAV controller 118, such as in the event that the one or more UAV sensors 120 experience less-than-optimal performance. Thus, the one or more parachute system sensors 116 and the steerable parachute controller 114 can act as a backup for the UAV controller 118 and the one or more UAV sensors 120. As another example, the steerable parachute controller 114 can receive data acquired by the UAV control system 104 and use that data to facilitate landing of the UAV 102 in the event that the one or more parachute system sensors 116 are experiencing less-than-optimal conditions. Other examples are possible as well.

To facilitate independent operation of the steerable parachute system 106, the steerable parachute controller 114 can be separate from the UAV controller 118, and/or the one or more parachute system sensors 116 can be separate from the one or more UAV sensors 120. Thus, the steerable parachute system 106 does not need to rely on operation of the UAV controller 118 and/or the one or more UAV sensors 120 to perform operations (e.g., acquiring data, selecting a safe landing location, controlling the plurality of steering actuators 112) for reliably, efficiently, and safely steer and land the UAV 102.

Additionally or alternatively, when the system 100 includes the parachute system power source 144, the parachute system power source 144 can be separate from the UAV power source 122. That way, if the UAV control system 104 experiences less-than-optimal performance relating to the UAV power source 122, the parachute system power source 144 can continue supplying power to the steerable parachute controller 114, the plurality of steering actuators 112, and/or other components of the steerable parachute system 106. Thus, the steerable parachute system 106 can operate as desired and can help safely land the UAV 102. Other examples of independent operation of the steerable parachute system 106 are possible as well.

Figure 2:
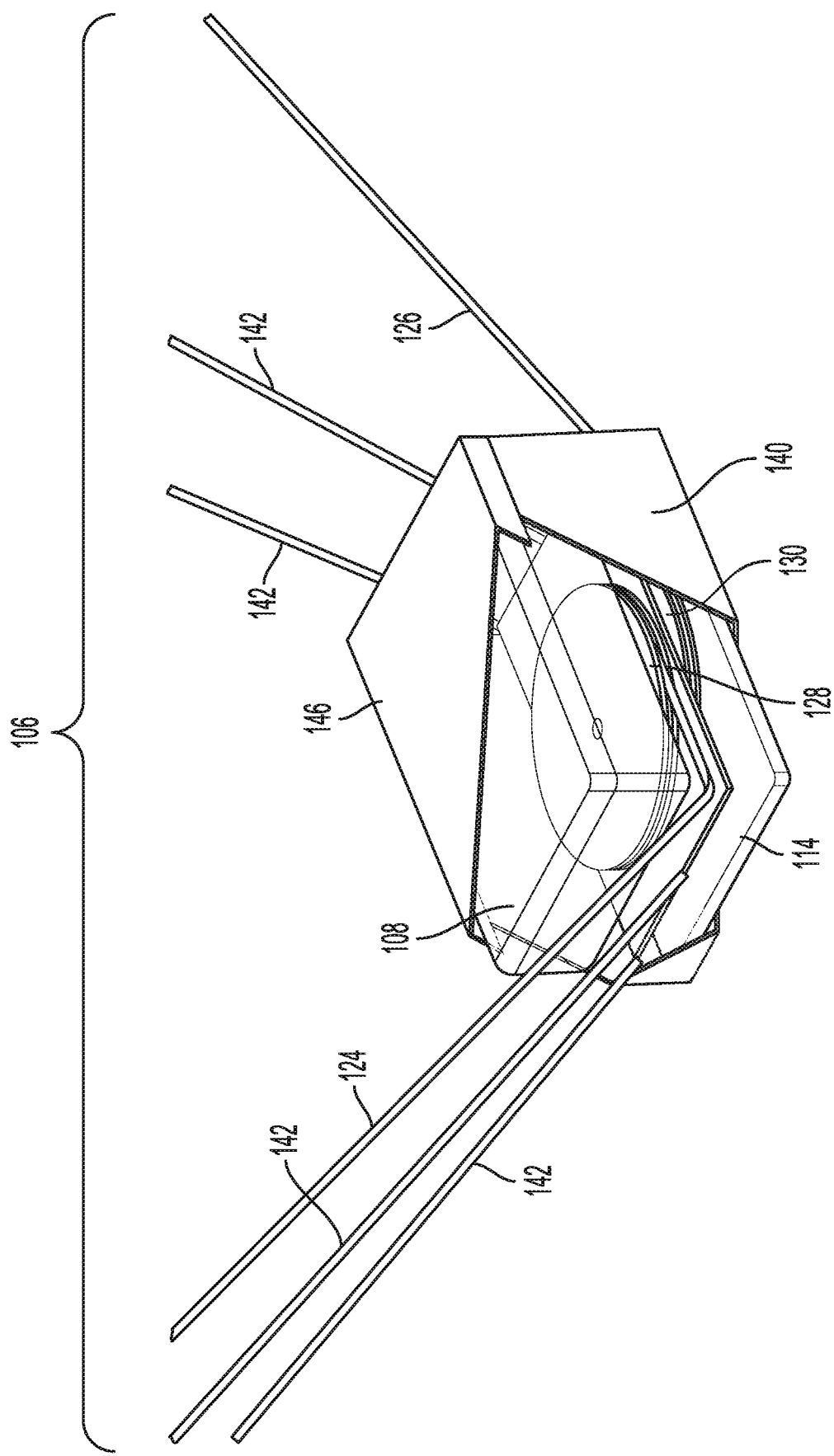
FIG. 2 depicts a cutaway view of an example portion of the steerable parachute system of FIG. 1, according to an example implementation.

FIG. 2 depicts a cutaway view of an example portion of the steerable parachute system 106 of FIG. 1, according to an example implementation. As shown, the steerable parachute system 106 includes the deployable parachute 108, the first steering actuator 128 (in the form of a pulley/motor mechanism), the second steering actuator 130 (in the form of a pulley/motor mechanism), and the steerable parachute controller 114 disposed in the housing 140. The housing 140 has a deployable lid 146 that can open to release the deployable parachute 108. FIG. 2 also shows the first steerable parachute cable 124, the second steerable parachute cable 126, and the plurality of static cables 142. Four static cables, two on each side, are shown as a representative example.

Figure 3:
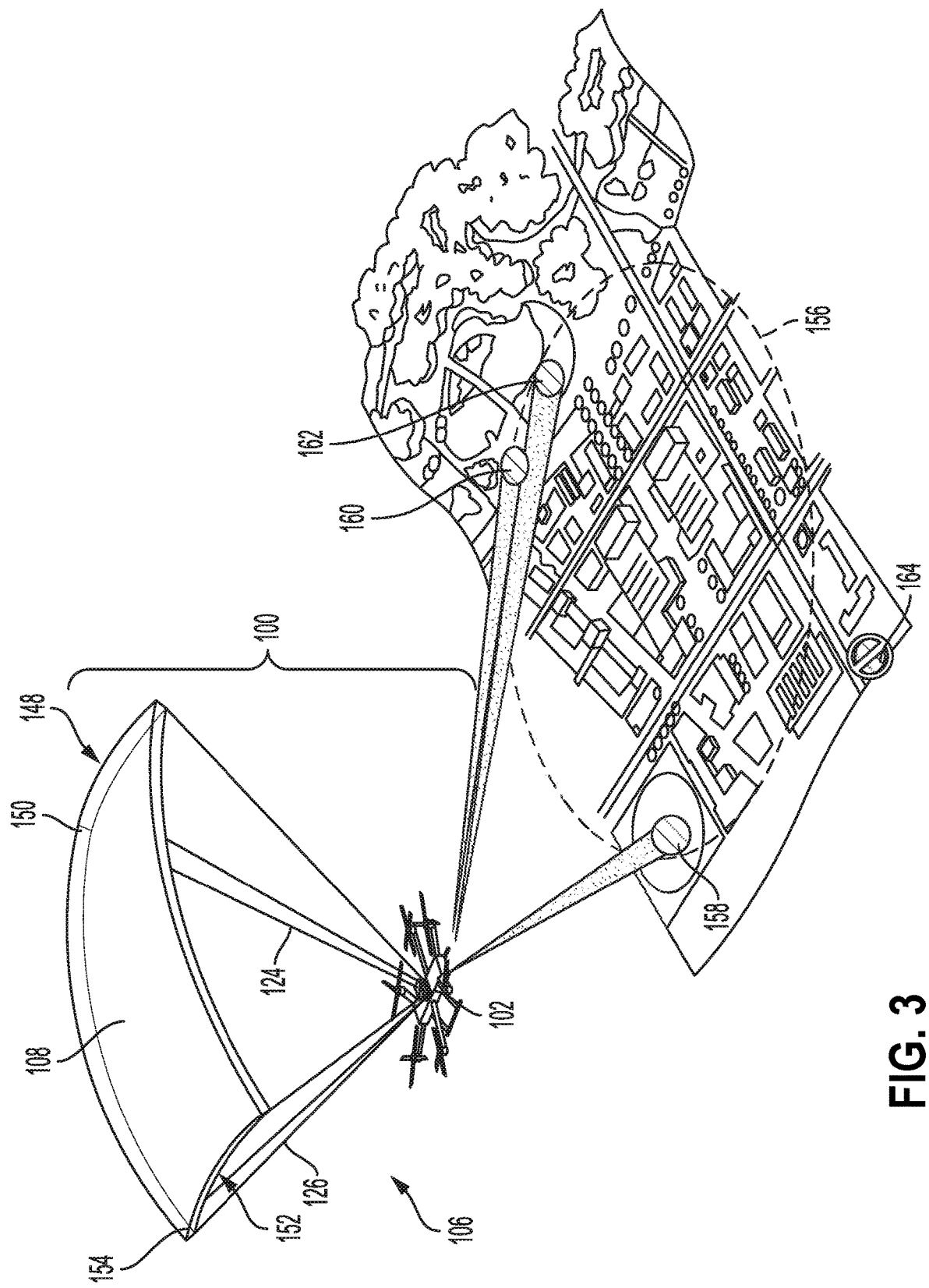
FIG. 3 depicts an example of the system of FIG. 1 in operation, according to an example implementation.

FIG. 3 depicts an example of the system 100 in operation, according to an example implementation. FIG. 3 also depicts an example of the deployable parachute 108 where the first steerable parachute cable 124 is attached to a first end 148 of the deployable parachute 108 at a first aft corner 150 and the second steerable parachute cable 126 is attached to a second end 152 of the deployable parachute 108 at a second aft corner 154. The following description of these operations refer to elements of the disclosed methods and systems that are explicitly shown in FIG. 1 and/or FIG. 2, but for simplicity are not explicitly shown in FIG. 3.

In operation, the steerable parachute controller 114 can be configured to detect a trigger for a parachute-assisted landing. The act of detecting the trigger can involve the steerable parachute controller 114 determining the trigger without involvement by the UAV control system 104 or can involve the steerable parachute controller 114 receiving an instruction or other message from the UAV control system 104 that indicates the trigger. As one example, the trigger can be the UAV control system 104 experiencing less-than-optimal or otherwise undesirable power supply, sensor operation, and/or other operation, any one or more of which the steerable parachute controller 114 might interpret as an indication that it may be desirable to initiate a landing procedure for the UAV 102. As another example, the trigger can be the one or more UAV sensors 120 and/or the one or more parachute system sensors 116 detecting inclement weather or other environmental conditions that might make it desirable to initiate a landing procedure for the UAV 102. As yet another example, the trigger can be the UAV controller 118 and/or the steerable parachute controller 114 receiving, from a ground control station or other device, an instruction to land the UAV 102. Other example triggers are possible as well.

The steerable parachute controller 114 can then perform various operations in response to detecting the trigger. In particular, the steerable parachute controller 114 can control the steerable parachute system 106 to deploy the deployable parachute 108. For example, the steerable parachute controller 114 can transmit a signal to release an electromechanical switch that unlocks the deployable lid 146, thereby releasing the deployable parachute 108 from the housing 140. Other examples are possible as well.

In response to detecting the trigger and/or before detecting the trigger, the steerable parachute controller 114 can detect physical characteristics of a reachable landing zone 156 for the UAV 102. The physical characteristics can include the presence or absence of grass, roads, trees, water, buildings, and/or other stationary objects or nonstationary objects (e.g., people, vehicles, etc.) on or near the ground, among other possible characteristics. To facilitate this, the one or more parachute system sensors 116 and/or the one or more UAV sensors 120 are configured to detect the physical characteristics of the ground, including the reachable landing zone 156, and configured to transmit data (e.g., GPS data, radar data, LIDAR data, etc.) indicating the physical characteristics to the steerable parachute controller 114. In some examples, the steerable parachute controller 114 can refer to a predetermined map or other data that identifies known physical characteristics of the reachable landing zone 156.

The reachable landing zone 156 refers to an area on land that the steerable parachute controller 114 determines to be close enough to the current location of the UAV 102 (e.g., within a threshold distance from the UAV 102) such that the UAV 102 can safely land somewhere within that area, even given any weather conditions (e.g., wind) or other conditions (e.g., air traffic) that might be present during landing.

To determine where within the reachable landing zone 156 to land the UAV 102, the steerable parachute controller 114 can, in response to detecting the trigger, select a safe landing location. FIG. 3 illustrates safe landing location 158, safe landing location 160, and safe landing location 162 as three representative examples of safe landing locations. For comparison, FIG. 3 also illustrates a landing location 164 that the steerable parachute controller 114 might determine to be a location at which the UAV 102 should not land, such as due to it being outside of the reachable landing zone 156 or perhaps due to it having physical characteristics that might make landing unsafe.

The steerable parachute controller 114 can select a safe landing location based on various types of data acquired by the system 100, including but not limited to data indicating the physical characteristics within the reachable landing zone 156. For example, in line with the discussion above, the steerable parachute controller 114 can select the safe landing location based on first data acquired by the one or more UAV sensors 120 and/or based on second data acquired by the one or more parachute system sensors 116, where the first data and the second data each include the physical characteristics of the reachable landing zone 156 for the UAV 102. In particular, the steerable parachute controller 114 can select the safe landing location based on the second data, but not the first data, due to independent operation of the steerable parachute system 106 and the steerable parachute system 106 having its own sensors to use in making the selection. Alternatively, the steerable parachute controller 114 can select the safe landing location based on both the first data and the second data, such as in situations where landing is desired and the one or more UAV sensors 120 are operating optimally and reliably.

The steerable parachute controller 114 can select the safe landing location using various techniques. For example, the steerable parachute controller 114 can refer to a predetermined map that indicates known areas, fields, etc. with little to no obstacles (e.g., trees, lakes, etc.). As another example, the steerable parachute controller 114 can analyze the first data and/or the second data to identify objects on the ground and select a location having less than a threshold amount of its area occupied by such objects (e.g., less than a threshold number of trees). Other techniques are possible as well.

In the event where there are multiple safe landing locations within the reachable landing zone 156, the steerable parachute controller 114 can use different criteria to select one of the safe landing locations, such as based on which safe landing location is closest to the current location of the UAV 102, which safe landing location is the largest (e.g., largest area), and/or which safe landing location has the least objects (e.g., buildings, trees, lakes, etc.) present. One or more of these criteria can be used to minimize the chance of collision with trees, buildings, etc. on the ground and/or to help ensure that the UAV 102 lands at an optimal location.

Having selected the safe landing location (e.g., safe landing location 158), the steerable parachute controller 114 can control movement of the plurality of steering actuators 112 to steer the deployable parachute 108 to land the UAV 102 at the safe landing location. For example, to steer the UAV 102 in one direction (e.g., left), the steerable parachute controller 114 can control the first steering actuator 128 to pull on or otherwise adjust the first steerable parachute cable 124 that is attached to the first aft corner, such as by controlling the first motor 134 to cause the first pulley 132 coupled to the first motor 134 to pull on the first steerable parachute cable 124. And to steer the UAV 102 in another direction (e.g., right), the steerable parachute controller 114 can control the second steering actuator 130 to pull on or otherwise adjust the second steerable parachute cable 126, such as by controlling the second motor 138 to cause the second pulley 136 coupled to the second motor 138 to pull on the second steerable parachute cable 126.

Figure 4:
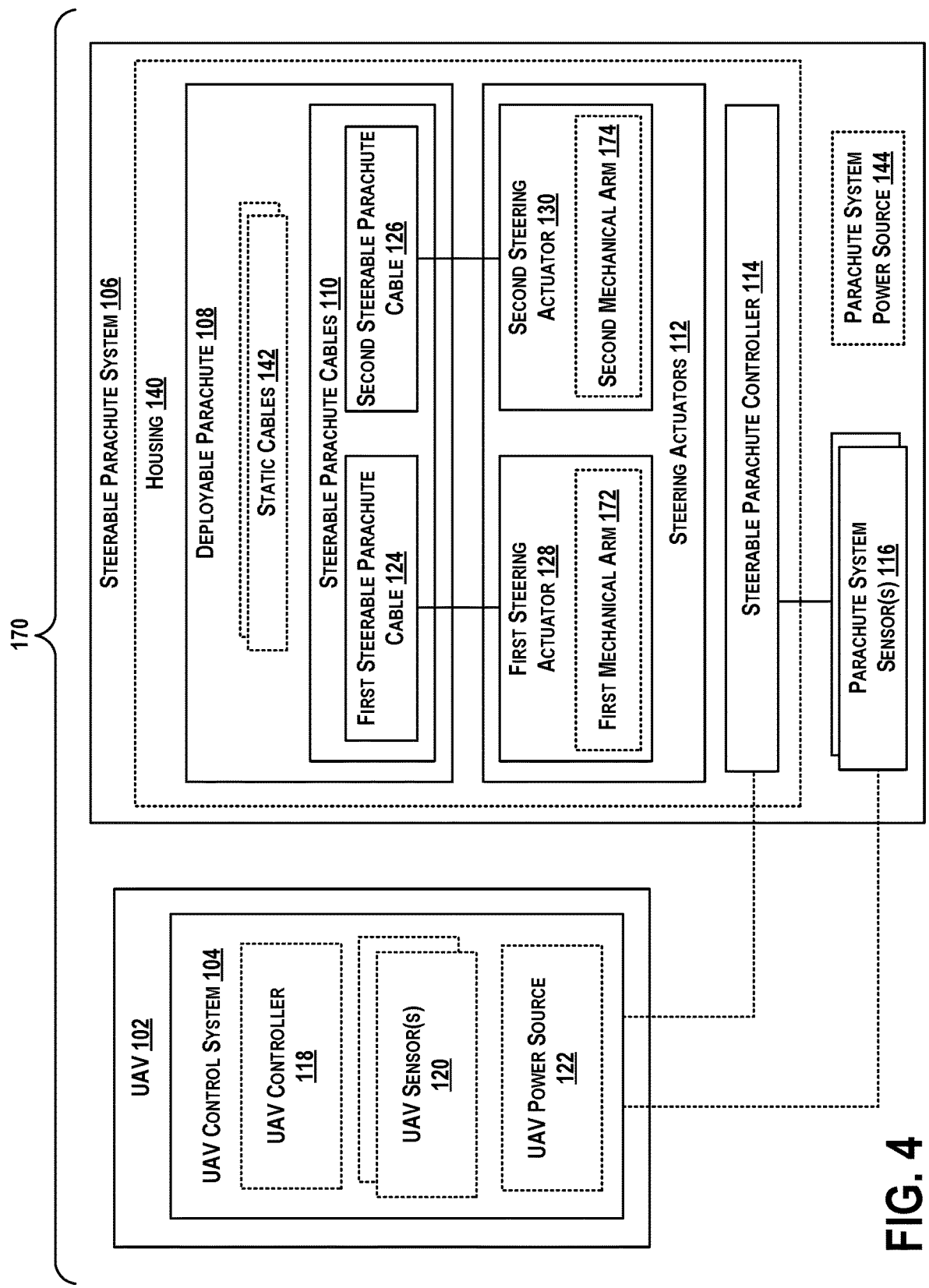
FIG. 4 depicts an example of a second system for employing a steerable parachute for a UAV, according to an example implementation.

FIG. 4 depicts an example of a second system 170 for employing a steerable parachute for the UAV 102, according to an example implementation. The second system 170 can be used as an alternative design to the system 100 illustrated in FIG. 1. As shown, the second system 170 includes, for instance, the one or more UAV sensors 120 attached to the UAV 102, the housing 140, the deployable parachute 108 disposed within the housing 140, the plurality of steering actuators 112 disposed within the housing 140, and the steerable parachute controller 114 disposed within the housing 140, among other components. As further shown, the deployable parachute 108 includes the plurality of static cables 142. FIG. 4 also shows that the first steering actuator 128 of the plurality of steering actuators 112 includes a first mechanical arm 172 and the second steering actuator 130 of the plurality of steering actuators 112 includes a second mechanical arm 174. In some examples, each steering actuator can include a motor or other actuator (not shown in FIG. 4) that causes movement of a respective mechanical arm. The steerable parachute controller 114 can be configured to perform any one or more of the operations described herein. For example, to steer the UAV 102 in one direction (e.g., left), the steerable parachute controller 114 can control the first mechanical arm 172 to pull on the first steerable parachute cable 124. And to steer the UAV 102 in another direction (e.g., right), the steerable parachute controller 114 can control the second mechanical arm 174 to pull on the second steerable parachute cable 126.

Figure 5:
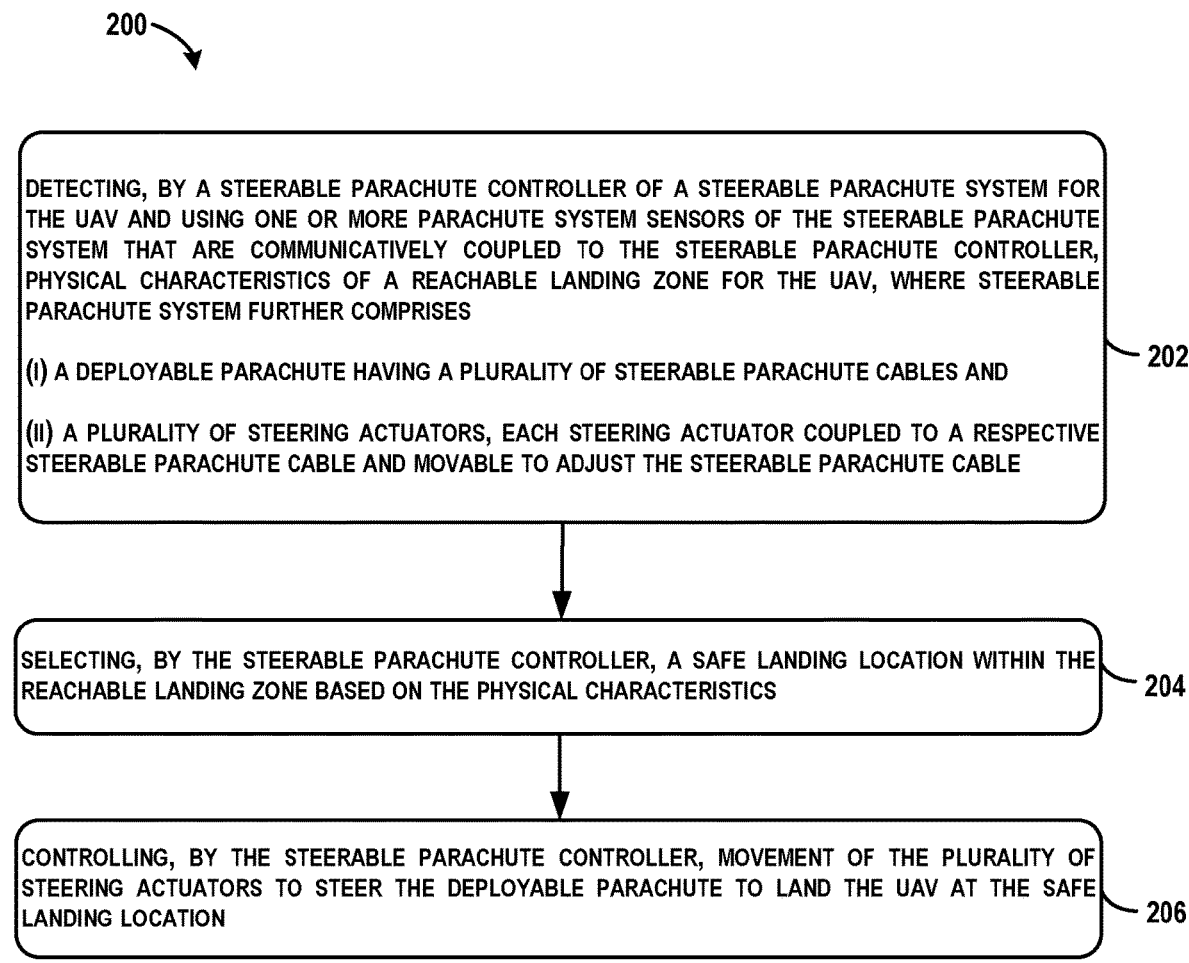
FIG. 5 shows a flowchart of an example method for parachute-assisted landing of a UAV, according to an example implementation.

FIG. 5 shows a flowchart of an example of a method 200 for parachute-assisted landing of a UAV, which could be used with the system 100 shown in FIG. 1 and/or with the second system shown in FIG. 4.

Method 200 includes the operations, functions, or actions as illustrated by blocks 202-206.

At block 202, the method 200 includes detecting, by a steerable parachute controller 114 of a steerable parachute system 106 for the UAV 102 and using one or more parachute system sensors 116 of the steerable parachute system 106 that are communicatively coupled to the steerable parachute controller 114, physical characteristics of a reachable landing zone 156 for the UAV 102, where steerable parachute system 106 further comprises (i) a deployable parachute 108 having a plurality of steerable parachute cables 110 and (ii) a plurality of steering actuators 112, each steering actuator coupled to a respective steerable parachute cable and movable to adjust the respective steerable parachute cable.

At block 204, the method 200 includes selecting, by the steerable parachute controller 114, a safe landing location 158, 160, 162 within the reachable landing zone 156 based on the physical characteristics.

At block 206, the method 200 includes controlling, by the steerable parachute controller 114, movement of the plurality of steering actuators 112 to steer the deployable parachute 108 to land the UAV 102 at the safe landing location 158, 160, 162.

Figure 6:
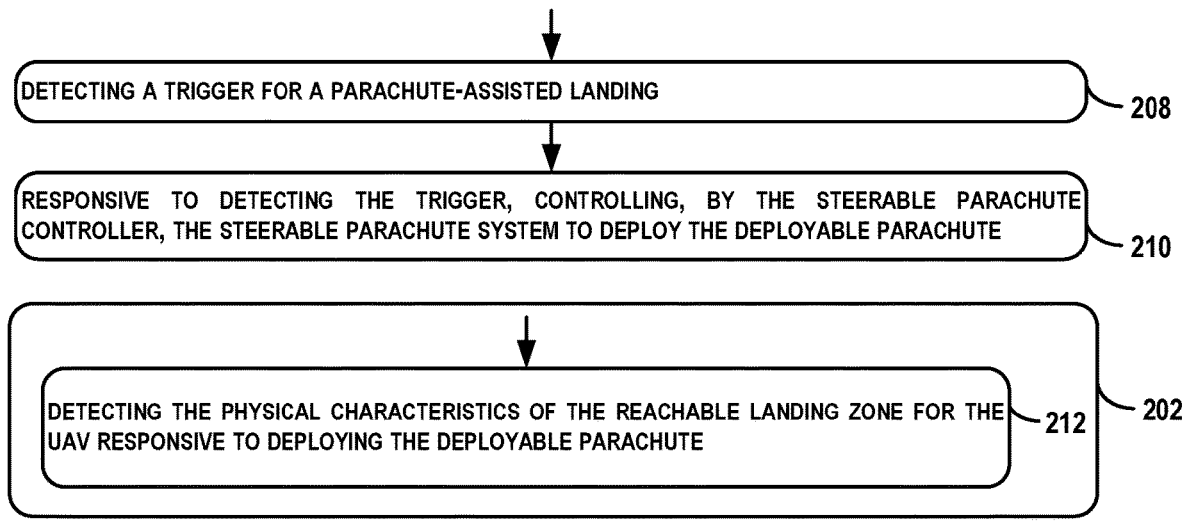
FIG. 6 shows a flowchart of an example method for use with the method of FIG. 5, as well as a flowchart of an example method for performing the detecting function of the method of FIG. 5, according to an example implementation.

FIG. 6 shows a flowchart of an example method for use with the method 200 of FIG. 5. At block 208, functions include detecting a trigger for a parachute-assisted landing. At block 210, functions include responsive to detecting the trigger, controlling, by the steerable parachute controller 114, the steerable parachute system 106 to deploy the deployable parachute 108.

FIG. 6 also shows a flowchart of an example method for performing the detecting function shown in block 202, according to an example implementation. At block 212, functions include detecting the physical characteristics of the reachable landing zone 156 for the UAV 102 responsive to deploying the deployable parachute 108.

Figure 7:
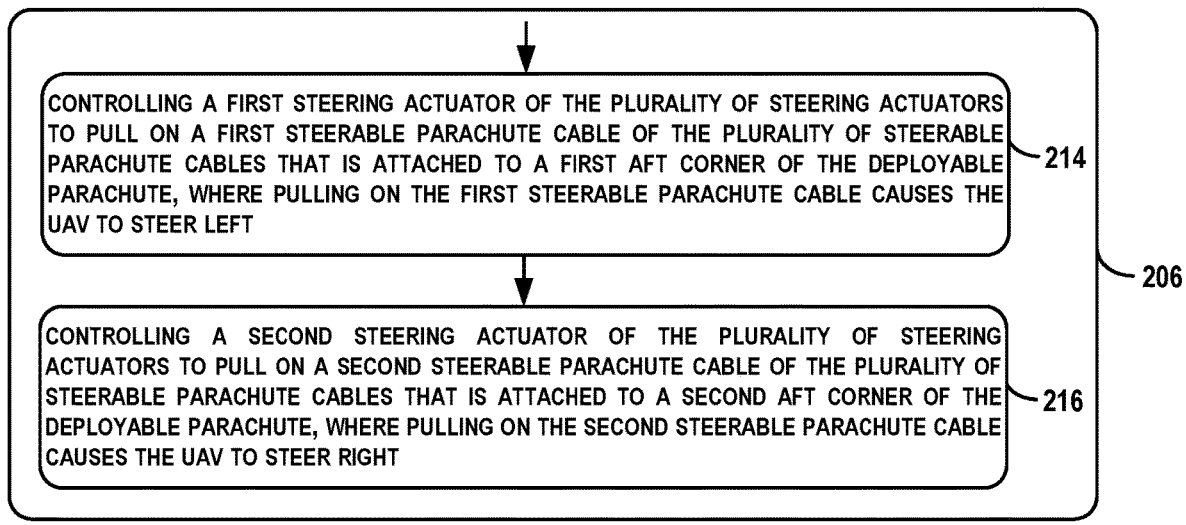
FIG. 7 shows a flowchart of an example method for performing the controlling function of the method of FIG. 5, according to an example implementation.

FIG. 7 shows a flowchart of an example method for performing the controlling function shown in block 206, according to an example implementation. At block 214, functions include controlling a first steering actuator 128 of the plurality of steering actuators 112 to pull on a first steerable parachute cable 124 of the plurality of steerable parachute cables 110 that is attached to a first aft corner 150 of the deployable parachute 108, where pulling on the first steerable parachute cable 124 causes the UAV 102 to steer left. At block 216, functions include controlling a second steering actuator 130 of the plurality of steering actuators 112 to pull on a second steerable parachute cable 126 of the plurality of steerable parachute cables 110 that is attached to a second aft corner 154 of the deployable parachute 108, where pulling on the second steerable parachute cable 126 causes the UAV 102 to steer right.

Figure 8:
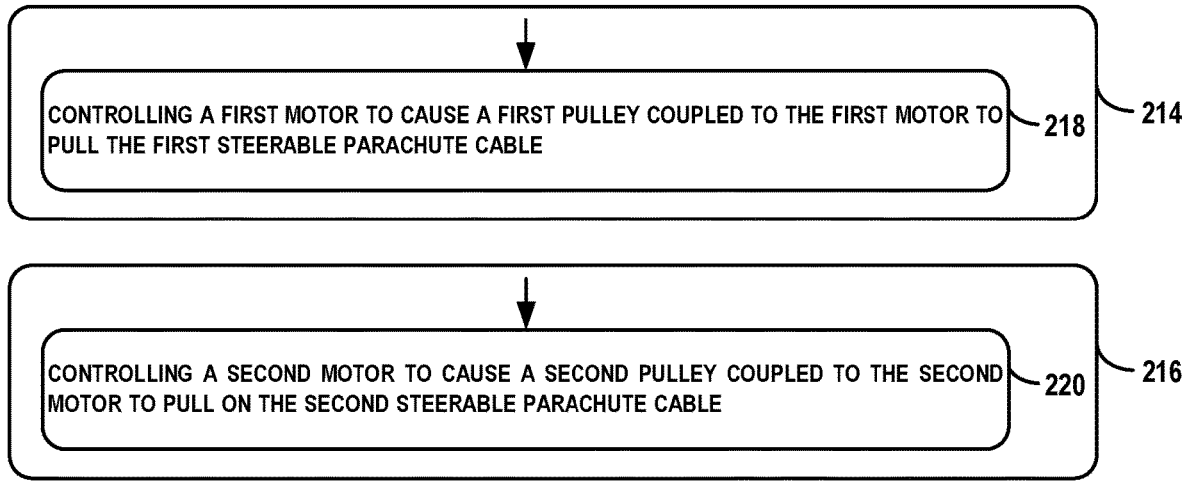
FIG. 8 shows a flowchart of an example method for performing the controlling functions of the method of FIG. 7, according to an example implementation.

FIG. 8 shows a flowchart of an example method for performing the controlling functions shown in block 214 and block 216, according to an example implementation. At block 218, functions include controlling a first motor 134 to cause a first pulley 132 coupled to the first motor 134 to pull the first steerable parachute cable 124. At block 220, functions include controlling a second motor 138 to cause a second pulley 136 coupled to the second motor 138 to pull on the second steerable parachute cable 126.

Figure 9:
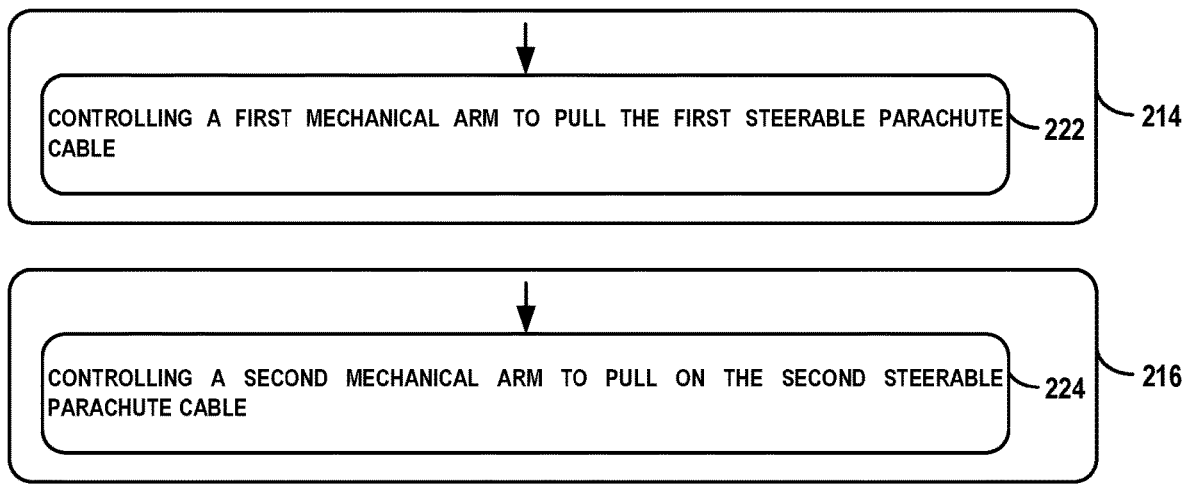
FIG. 9 shows a flowchart of another example method for performing the controlling functions of the method of FIG. 7, according to an example implementation.

FIG. 9 shows a flowchart of another example method for performing the controlling functions shown in block 214 and block 216, according to an example implementation. At block 222, functions include controlling a first mechanical arm 172 to pull the first steerable parachute cable 124. At block 224, functions include controlling a second mechanical arm 174 to pull on the second steerable parachute cable 126.

In some examples, the steerable parachute system 106 operates independently from a UAV control system 104 of the UAV 102 such that the detecting, the selecting, and the controlling of blocks 202-206 are performed independently from operations performed by the UAV control system 104.

Devices or systems may be used or configured to perform logical functions presented in FIGS. 5, 6, 7, 8, and 9. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Although blocks in FIGS. 5, 6, 7, 8, and 9 are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for these and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIGS. 5, 6, 7, 8, and 9 may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system comprising:
an unmanned aerial vehicle (UAV) having a UAV control system to control flight of the UAV, wherein the UAV control system comprises a UAV controller; and
a steerable parachute system for parachute-assisted landing, comprising (i) a deployable parachute having a plurality of steerable parachute cables, (ii) a plurality of steering actuators, each steering actuator coupled to a respective steerable parachute cable and movable to adjust the respective steerable parachute cable, (iii) a steerable parachute controller, and (iv) one or more parachute system sensors communicatively coupled to the steerable parachute controller and configured to detect physical characteristics of a reachable landing zone for the UAV,
wherein the steerable parachute controller is separate from the UAV controller and configured to (i) select a safe landing location within the reachable landing zone based on the physical characteristics detected with the one or more parachute system sensors and (ii) control movement of the plurality of steering actuators to steer the deployable parachute to land the UAV at the safe landing location.

2. The system of claim 1, wherein the steerable parachute system operates independently from the UAV control system.

3. The system of claim 1, wherein the UAV control system further comprises one or more UAV sensors, and
wherein the one or more UAV sensors are separate from the one or more parachute system sensors of the steerable parachute system.

4. The system of claim 1, wherein the UAV control system comprises a UAV power source and the steerable parachute system further comprises a parachute system power source, and wherein the parachute system power source is separate from the UAV power source.

5. The system of claim 1, wherein the one or more parachute system sensors are attached to the UAV.

6. The system of claim 1, wherein the plurality of steering actuators comprises a first steering actuator and a second steering actuator, wherein the plurality of steerable parachute cables comprises a first steerable parachute cable attached to a first end of the deployable parachute and a second steerable parachute cable attached to a second end of the deployable parachute, opposite the first end, and wherein the first steering actuator is movable to adjust the first steerable parachute cable and the second steering actuator is movable to adjust the second steerable parachute cable.

7. The system of claim 6, wherein the first steerable parachute cable is attached to a first aft corner of the deployable parachute and the second steerable parachute cable is attached to a second aft corner of the deployable parachute.

8. The system of claim 1, wherein each steering actuator comprises a pulley coupled to a motor, and wherein controlling the movement of the plurality of steering actuators to steer the deployable parachute to land the UAV at the safe landing location comprises controlling the motor to cause the pulley to adjust the respective steerable parachute cable.

9. The system of claim 1, wherein the steerable parachute system further comprises a housing within which the deployable parachute is releasably disposed, the plurality of steering actuators is disposed, and the steerable parachute controller is disposed, and wherein the deployable parachute further comprises a plurality of static cables attached to the housing.

10. A method for parachute-assisted landing of an unmanned aerial vehicle (UAV), the method comprising:

detecting, by a steerable parachute controller of a steerable parachute system for the UAV and using one or more parachute system sensors of the steerable parachute system that are communicatively coupled to the steerable parachute controller, physical characteristics of a reachable landing zone for the UAV, wherein steerable parachute system further comprises (i) a deployable parachute having a plurality of steerable parachute cables and (ii) a plurality of steering actuators, each steering actuator coupled to a respective steerable parachute cable and movable to adjust the respective steerable parachute cable, wherein the UAV comprises a UAV control system having a UAV controller, and wherein the steerable parachute controller is separate from the UAV controller;

selecting, by the steerable parachute controller, a safe landing location within the reachable landing zone based on the physical characteristics; and controlling, by the steerable parachute controller, movement of the plurality of steering actuators to steer the deployable parachute to land the UAV at the safe landing location.

11. The method of claim 10, further comprising:

detecting a trigger for a parachute-assisted landing; and responsive to detecting the trigger, controlling, by the steerable parachute controller, the steerable parachute system to deploy the deployable parachute, wherein the detecting of the physical characteristics of the reachable landing zone for the UAV comprises detecting the physical characteristics of the reachable landing zone for the UAV responsive to deploying the deployable parachute.

12. The method of claim 10, wherein controlling the movement of the plurality of steering actuators to steer the deployable parachute to land the UAV at the safe landing location comprises:

controlling a first steering actuator of the plurality of steering actuators to pull on a first steerable parachute cable of the plurality of steerable parachute cables that is attached to a first aft corner of the deployable parachute, wherein pulling on the first steerable parachute cable causes the UAV to steer left; and controlling a second steering actuator of the plurality of steering actuators to pull on a second steerable parachute cable of the plurality of steerable parachute cables that is attached to a second aft corner of the deployable parachute, wherein pulling on the second steerable parachute cable causes the UAV to steer right.

13. The method of claim 12, wherein controlling the first steering actuator to pull on the first steerable parachute cable comprises controlling a first motor to cause a first pulley coupled to the first motor to pull the first steerable parachute cable, and wherein controlling the second steering actuator to pull on the second steerable parachute cable comprises controlling a second motor to cause a second pulley coupled to the second motor to pull on the second steerable parachute cable.

14. The method of claim 12, wherein controlling the first steering actuator to pull on the first steerable parachute cable comprises controlling a first mechanical arm to pull the first steerable parachute cable, and wherein controlling the second steering actuator to pull on the second steerable parachute cable comprises controlling a second mechanical arm to pull on the second steerable parachute cable.

15. The method of claim 10, wherein the steerable parachute system operates independently from the UAV control system of the UAV such that the detecting, the selecting, and the controlling are performed independently from operations performed by the UAV control system.

16. A system comprising:

an unmanned aerial vehicle (UAV) having a UAV control system to control flight of the UAV, the UAV control system comprising one or more UAV sensors attached to the UAV; and a steerable parachute system for parachute-assisted landing, comprising (i) a housing, (ii) a deployable parachute releasably disposed within the housing, the deployable parachute having a plurality of steerable parachute cables and a plurality of static cables, (iii) a plurality of steering actuators disposed within the housing, each steering actuator coupled to a respective steerable parachute cable and movable to adjust the respective steerable parachute cable, (iv) a steerable parachute controller disposed within the housing, and (iv) one or more parachute system sensors attached to the UAV and communicatively coupled to the steerable parachute controller, wherein the steerable parachute system operates independently from the UAV control system, and wherein the steerable parachute controller is configured to
- (i) detect a trigger for a parachute-assisted landing and
- (ii) responsive to detecting the trigger, (a) select a safe landing location based on at least one of first data acquired by the one or more UAV sensors or second data acquired by the one or more parachute system sensors and (b) control movement of the plurality of steering actuators to steer the deployable parachute to land the UAV at the safe landing location.

17. The system of claim 16, wherein the UAV control system comprises a UAV controller and one or more UAV sensors, wherein the steerable parachute controller is separate from the UAV controller, and wherein the one or more UAV sensors are separate from the one or more parachute system sensors of the steerable parachute system.

18. The system of claim 16, wherein the steerable parachute controller is configured to select the safe landing location based on the second data, but not the first data.

19. The system of claim 16, wherein the steerable parachute controller is configured to select the safe landing location based on the first data and the second data.

20. The system of claim 16, wherein at least one of the first data or the second data comprises physical characteristics of a reachable landing zone for the UAV, and
- wherein the steerable parachute controller is configured to select the safe landing location by selecting the safe landing location within the reachable landing zone based on the physical characteristics.

* * * * *